United States Patent
Knoll

(10) Patent No.: US 7,365,705 B2
(45) Date of Patent: Apr. 29, 2008

(54) FLIGHT CONTROL DISPLAY

(75) Inventor: Alexander Knoll, Munich (DE)

(73) Assignee: EADS Deutschland GmbH, Munich (DE)

( * ) Notice: Subject to any disclaimer, the term of this patent is extended or adjusted under 35 U.S.C. 154(b) by 1389 days.

(21) Appl. No.: 09/852,292

(22) Filed: May 10, 2001

(65) Prior Publication Data

US 2002/0010530 A1 Jan. 24, 2002

(30) Foreign Application Priority Data

May 10, 2000 (DE) ................................ 100 22 820

(51) Int. Cl.
*G09G 5/00* (2006.01)
(52) U.S. Cl. ............................ 345/7; 340/953; 434/43; 701/4
(58) Field of Classification Search ................. 345/7, 345/8, 9, 419, 619, 649, 672, 629; 434/37, 434/38, 43, 32, 35; 701/4, 10, 14, 200; 703/8; 340/971, 945, 953
See application file for complete search history.

(56) References Cited

U.S. PATENT DOCUMENTS

| | | | |
|---|---|---|---|
| 5,296,854 A | 3/1994 | Hamilton et al. ............ 340/980 |
| 5,343,395 A * | 8/1994 | Watts ........................... 701/16 |
| 5,388,990 A * | 2/1995 | Beckman ...................... 434/38 |
| 5,420,582 A | 5/1995 | Kubbat et al. ............... 340/974 |
| 5,745,073 A * | 4/1998 | Tomita ......................... 342/179 |
| 6,150,960 A * | 11/2000 | Voulgaris .................... 340/975 |
| 6,173,220 B1 * | 1/2001 | Schmitt ......................... 701/4 |
| 6,389,333 B1 * | 5/2002 | Hansman et al. .............. 701/3 |

FOREIGN PATENT DOCUMENTS

DE 198 12 037 A1 3/1998
EP 0874222 10/1998

OTHER PUBLICATIONS

J. Williams, et al. "Effects of Integrated Flight Path and Terrain Displays on Controlled Flight into Terrain" Proceedings of the International Conf. on Systems, Oct. 17-20, 1993. pp. 709-714.

(Continued)

*Primary Examiner*—Richard Hjerpe
*Assistant Examiner*—Abbas Abdulselam
(74) *Attorney, Agent, or Firm*—Crowell & Moring LLP

(57) ABSTRACT

An aircraft flight control display for orientation of the pilot during an approach of the aircraft toward a destination has a center of the display as its fixed point. An aircraft symbol with a center depicts the longitudinal axis as well as a lateral line to depict the current attitude of the aircraft. A destination position symbol has a reference line and a position symbol, with a skyline having a center. The destination position symbol is located at a distance from the center and its reference line points to the center as the reference point. The destination position symbol is rotated around the reference point dependent on the relative position of the aircraft's direction or the flight direction to the desired destination direction.

10 Claims, 4 Drawing Sheets

OTHER PUBLICATIONS

"High Costs Force Avionics Links", Interavia Aerospace Review, Jan. 1992, pp. 45-53 Barry Miller report.

"Cockpit Revolution: Help of Hindrance?", Interavia Aerospace Review, Jan. 1992, pp. 60-62; Wilbry Crawford and John Keller report.

"Developing the Next Geenration Cockpit Display System", IEEE AES Systems Magazine, Oct. 1996, B.C. Read, III, pp. 25-28.

"ESA Shifting Station Utilization to Industry" Aviation Week & Space Technology/ Apr. 10, 2000, Michael A. Taverna/Paris, p. 51.

* cited by examiner

FLIGHT CONTROL DISPLAY

BACKGROUND AND SUMMARY OF THE INVENTION

This application claims the priority of German patent document 100 22 820.8, filed May 10, 2000, the disclosure of which is expressly incorporated by reference herein.

The invention relates to a flight control display, which is suitable for both the cockpit of a manned aircraft and for a ground station that controls an unmanned aircraft. The flight control display according to the invention serves the purpose of selecting a destination, which can be a waypoint, a runway or load drop-off location, in a specified flight direction.

State-of-the-art flight control displays that are integrated into the flight director or forward view, such as the head-up display configurations described in the magazine "Flying," May 1999 issue, p. 68 and so on, or in Tom Clancy's "Fighter Wing," Heyre Publishing Co., Munich, Germany, 1996, p. 56, utilize a diagrammatic approach base line. The relative position of this approach base line indicates on the display (e.g., on the screen) the position of the aircraft relative to the straight approach base line of the destination. The approach base line shown in the state of the art can be a symbol for the runway or for the final approach direction, which in general can also be at an angle to the runway. The direction of the approach base line is specified, known to the system and cannot be modified arbitrarily by the pilot. Its position on the display results from current navigational data. Depending on the motion of the aircraft relative to the approach line of the destination, the approach base line and/or its symbol on the display also moves to one side or upward/downward.

State-of-the-art flight control displays integrated into the flight director or the forward view are therefore shown in the forward view perspective of the pilot and/or a fictitious observer of a ground station located in the cockpit.

One disadvantage of this type of projection is that the approach base line can only be shown in a certain sector, due to the specified perspective of the display. During phases of the approach where the aircraft initially flies in a direction opposite the final approach direction, the pilot must observe a second navigational display in order to estimate the relative position and the flight direction of the aircraft relative to the specified final approach direction. He must therefore divert his view from e.g., a head-up display. Both displays must then first be processed intellectually by the pilot before he can estimate his relative position and flight direction toward the destination and/or final approach direction. Thus, particular advantage of an integrated display (to have to observe only one display to gather all flight status information and navigational information) is lost. With a head-up display, the pilot loses the ability to simultaneously observe the outside.

State-of-the-art displays therefore create difficulties, especially when the pilot must fly sections with arc patterns during the last flight phases before the final approach.

One object of the invention is therefore to provide a flight control display that is integrated into the flight director and that shows the pilot a view of his relative position and flight direction in relation to a specified final approach direction of a destination without limiting the viewing ability of the display to certain aircraft positions.

In unmanned aircraft, which are equipped to allow a pilot's view with a camera, another object of the invention is to provide a flight control display that is integrated in the forward view and whose view is not limited to the sectional view of the camera.

These and other objects and advantages are achieved by the display according to the invention, in which the aircraft's position relative to the destination and desired direction (for example, relative to the runway and direction of the runway and/or the flyover direction at a certain destination) is shown in a full 360° view around the aircraft. When the invented projection is used, for example with a head-up display, the front view, the airspace with the final approach direction and the current flight direction as well as general flight control parameters can be viewed simultaneously.

The display according to the invention is beneficial for a curving approach. It is also advantageous in situations where the runway or the destination is not visible with the mere eye because the relative position of the aircraft is not favorable, because the weather does not permit visibility or the runway and/or because the destination is hidden for topographic reasons. With low visibility (e.g., when a side view onto the runway cannot be observed), the flight control display according to the invention offers a projection of the relative position of the aircraft and the aircraft's direction in relation to the destination. Beyond that, in the case of DME/arc approaches and approaches where the final approach direction and the desired destination direction (e.g., runway direction) do not agree, the display of the desired destination direction (the desired direction of the aircraft over or at the destination) enables clear orientation in connection with the view of the aircraft's direction relative to the destination.

The display according to the invention is particularly favorable when a change from an instrument approach to a directionally deviant final approach based on visual conditions must be performed because the invented display integrates all relevant directions in the horizontal plane and the forward view of the pilot with each other, without limiting the latter due to a fictitious viewing angle.

The display according to the invention can also be used beneficially during approaches that require very precise navigation by outside visibility, such as for example on unmanned aircraft, which at the same time permit only a very limited viewing angle (e.g., through the camera) of the outside.

According to the invention, the relative position and direction of the aircraft relative to the destination and/or desired destination direction are integrated into the flight director or forward view. The "forward view" here can also be a head-up display (HUD) outside view, screen projection, a view projected into a visor (helmet-mounted display or HMD) or in the case of an unmanned flight a camera view, onto which generally also HUD-like information is superimposed.

The invention in general relates to the approach of destinations or locations (e.g., a runway or the touchdown point of a runway, ground destinations of armed aircraft, landing decks on buildings or ships or load drop-off locations).

Other objects, advantages and novel features of the present invention will become apparent from the following detailed description of the invention when considered in conjunction with the accompanying drawings.

DETAILED DESCRIPTION OF THE DRAWINGS

Figure 1:
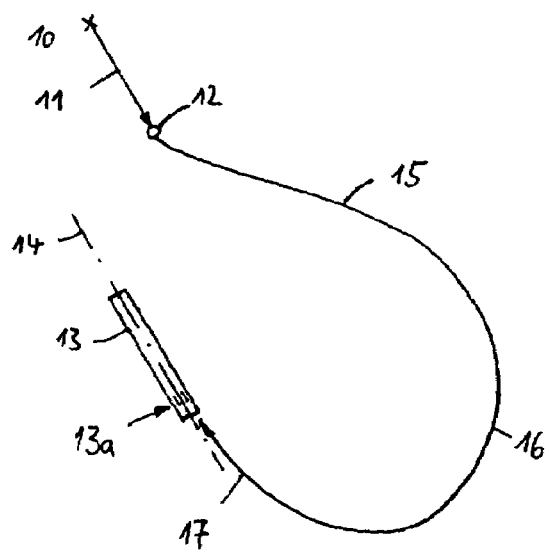
FIG. 1 is a diagrammatic view of an approach at a runway viewed from above with a last navigation waypoint, an approach in the opposite direction of the runway, an arced section, and final approach until touchdown.

FIG. 1 shows an example of an approach from above, where the flight control display according to the invention can be employed in a beneficial manner. The aircraft (not shown) is flying in a flight section 11 toward a last defined waypoint 12 (e.g., a radio beacon), from which the approach to a destination 13a can take place. The latter, in turn, can be a flyover point, a drop-off location, a landing location and particularly the desired touchdown point of a runway 13 with a center line 14. The approach takes place in a section 15 off to the side of the runway 13 and opposite the landing direction, and ends in an arced section 16, after which the final approach 17 occurs until the plane has landed on the runway 13. At all times during the approach, the flight control display according to the invention provides the pilot with a projection of the destination and the final approach direction relative to the aircraft and the aircraft's direction. The aircraft's direction here should be interpreted as the alignment of the aircraft in its longitudinal axis, which differs from the flight direction due to current wind conditions. In the display according to the invention, the flight direction may also be used instead of the aircraft's direction. In the following, however, only the aircraft's direction will be mentioned as an example.

The direction of the final approach 17 does not have to agree with the direction of the center line 14 of the runway 13, but can also run at an angle to it. The flight control display according to the invention refers to the destination 13a and optionally also to the desired direction in or at the destination 13a, which is described herein as the desired destination direction.

Figure 2:
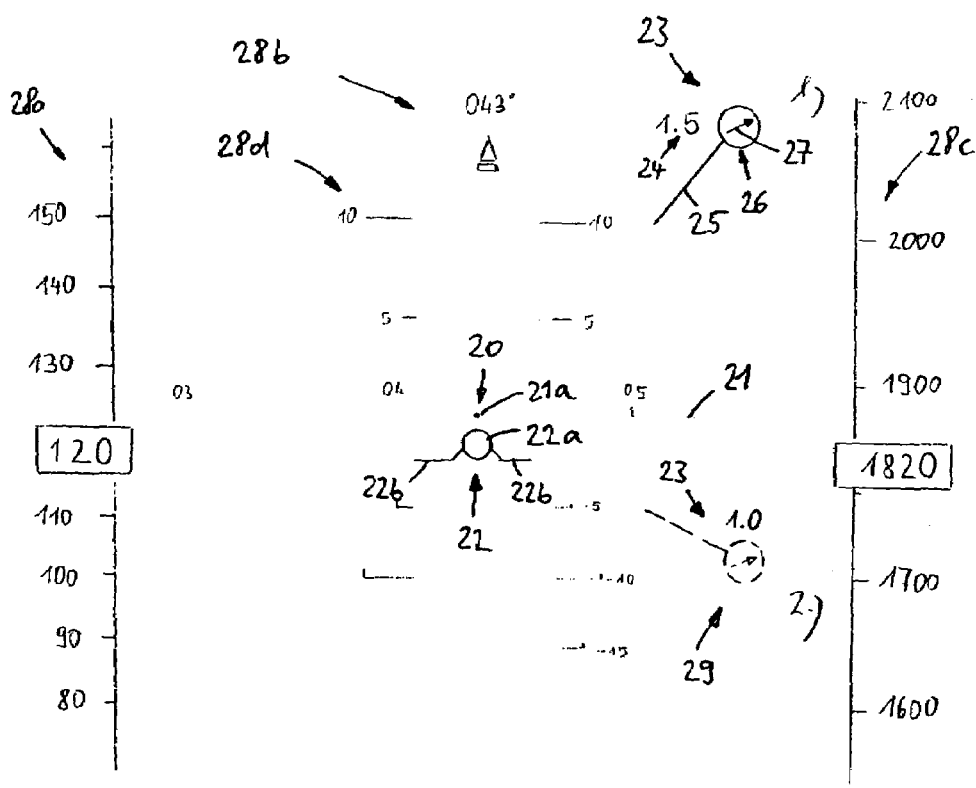
FIG. 2 illustrates an embodiment of the flight control display according to the invention, wherein the center of the view is the center of the skyline, and the reference point of the reference line of the destination position symbol is equal to the center of the abeam line, and the abeam direction is equal to the skyline.

In the embodiment of the flight control display according to the invention shown in FIG. 2, the center of the display 20, the fixed point of the display so-to-speak, is the center 21a of the skyline 21. The skyline 21 is the horizontal direction as seen from the aircraft. The flight control display in FIG. 2 also shows an aircraft symbol 22, whose relative position to the skyline 21 is determined by the aircraft's direction relative to the horizontal plane. Depending on the embodiment, this aircraft symbol can either indicate the aircraft's position or the flight path vector. In the situation shown in FIG. 2 this would mean that the aircraft is either directed downward (i.e., to the ground) compared to the horizontal plane or that the flight path points downward.

Depending on the aircraft's direction, the aircraft symbol 22 therefore moves upward or downward in the vertical plane relative to the skyline 21. In the case of a sideslipping flight, this aircraft symbol 22 could also move sideways to the center line of the display as long as it indicates the flight path vector. The position of the aircraft symbol 22 toward the skyline 21 is determined either by its position in space (i.e., longitudinal position angle and hanging angle) or by the direction of the flight path.

The aircraft symbol 22 has a center 22a and two cross-lines 22b to the side of the center, running in opposite directions, which symbolize the wings of the aircraft and whose position on the display indicates e.g., the current attitude of the aircraft.

In addition to the previously described depiction according to the state of the art, the invented flight control display also depicts a destination position symbol, which in the pictures of FIGS. 2, 3, 5, 6, 7, 8 has the reference code 23. A dimension figure (with the reference code 24) assigned to the destination position symbol 23, indicates the current distance of the aircraft, preferably in nautical miles, from the destination. In accordance with the invention, the destination position symbol 23 comprises a reference line 25 and a position symbol 26, which includes a desired destination direction view 27. This desired destination direction can, for example, be the direction of the runway. The reference line 25 indicates the aircraft's direction relative to the destination (i.e., the runway 13).

According to the invention, this reference line 25 is directed at the center 20 of the display, which coincides either with the center 21a of the skyline 21 or with the center 22a of the aircraft symbol 22 for all shown flight status possibilities. In FIG. 2, the center 20 of the display coincides with the center 21a of the skyline 21 so that the reference line 25 is directed at the center 20 and simultaneously at the center 21a of the skyline 21.

According to the invention, the position symbol 26 has the shape of a circle so as not to provide the pilot with any opportunity to infer any directional indication from it. However, the position symbol 26 can be shown in any geometrical shape or form or as a color-filled field with or without outline.

The desired destination direction display 27 is the horizontal desired direction of the final approach 17 at the destination (for example, at the point of touchdown on the runway). The desired destination direction display 27 can be a line or similar symbol, such as an arrow as shown in FIG. 2. When the landing direction is known, the arrow can avoid confusion with the opposite direction (landing on the same runway in opposite direction). During the landing process, this desired destination direction usually coincides with the direction of the center line 14 of the runway 13. In general, however, a case where the desired destination direction is at an angle to the center line 14 of the runway or a flyover direction can also be depicted in accordance with the invention.

The specific direction that is aligned perpendicularly to the aircraft's direction off to the side from the top view of the aircraft and/or from the vertical view (i.e., the map view) Is called the "abeam" direction herein. In the figure, this abeam direction depends on the reference point for the reference line 25. In the embodiment shown in FIG. 2, the abeam line extends in the direction of the skyline 21. Accordingly, the destination position symbols depicted here above the skyline are in front of the aircraft, while position symbols depicted beneath the skyline are behind the aircraft.

The flight control display according to the invention can preferably also be equipped with the usual displays for speed, height and attitude of the aircraft. The embodiment in accordance with FIG. 2 for example shows a speed scale 28*a*, an attitude scale 28*b* and a height scale 28*c* as well as a longitudinal position angle scale 28*d*.

During operation and climbing and descending flight (i.e., when the aircraft rotates around the lateral axis), the reference line is shifted upward or downward. When the aircraft flies a curve, i.e. a rotation around the longitudinal axis from the pilot's view, the reference line 25 is shifted with the position symbol. In the abeam position (when the reference line 25 coincides with the skyline 21), the destination is located exactly in the lateral direction of the aircraft. The destination position symbol 23 is preferably located in the periphery of the depicted field at a distance that is sufficient for the observer to recognize the reference line direction and in any case to the side or beneath or above of its reference point. Optionally, with decreasing distance it can also move in the direction toward the reference point (i.e., the center 20 of the display), and move away from this point as the aircraft increases the distance to the destination. "Periphery" in this case should basically be interpreted as the area outside the longitudinal position scale 28*d*.

As an additional example, FIG. 2 depicts another destination position symbol 23, in a broken line at the location 29, indicating the position of a destination at an angle behind the aircraft.

Components of the flight control display according to the invention that have the same functions in the alternative embodiments in FIGS. 3 through 8 have the same reference codes as in the embodiment in FIG. 2.

Figure 3:
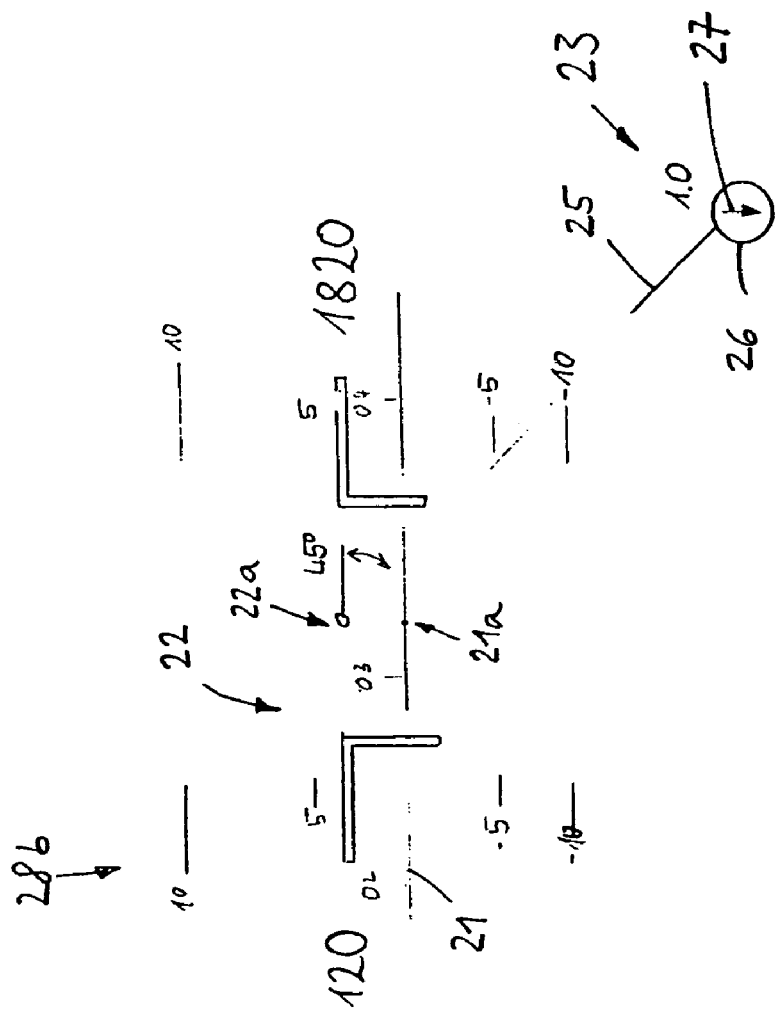
FIG. 3 shows another embodiment of the flight control display according to the invention, in which the center of the view is the aircraft symbol, the reference line of the destination position symbol refers to the aircraft symbol, and the abeam direction runs through the aircraft symbol.

The embodiment in FIG. 3 also shows the aircraft symbol 22, whose center coincides with the center 20 of the display in all flight situations. The skyline 21, however, moves relative to the center 20 and/or the aircraft symbol 22, depending on the position that the aircraft assumes in the space. The destination position symbol 23 with the reference line 25 and the position symbol 26 is defined in such a way that the reference line 25 in turn crosses through the center 20 of the display and in the specific embodiment in FIG. 3 through the center of the aircraft symbol 22.

Figure 4:
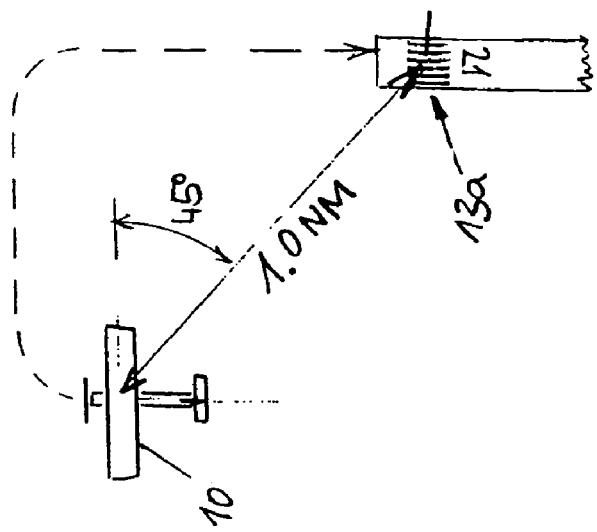
FIG. 4 is a diagrammatic view of the aircraft, its approach path and the runway from above, in which the aircraft is located in a position that is displayed by the view in FIG. 3.

In the situation shown by the display in FIG. 3, the destination is located at a 45° angle behind the aircraft to the right from the pilot's view. Additionally, the desired destination direction display 27 shows that the desired destination direction is exactly opposite the current flight direction. This is also shown in FIG. 4, (which is associated with FIG. 3), depicting the appropriate current position of the aircraft 10 at the destination 13*a*, e.g. a runway 13.

Figure 6:
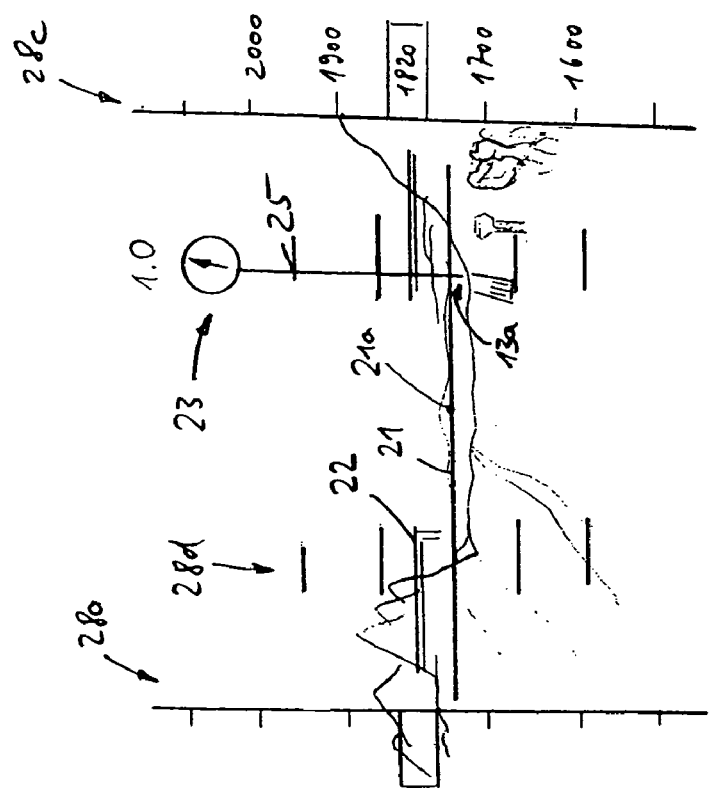
FIG. 6 shows the flight control display according to the invention in a situation where the runway is within the range of visibility and where, as another option of the flight control display according to the invention, the reference line of the destination position symbol is directed at the destination (e.g., the runway)
Figure 5:
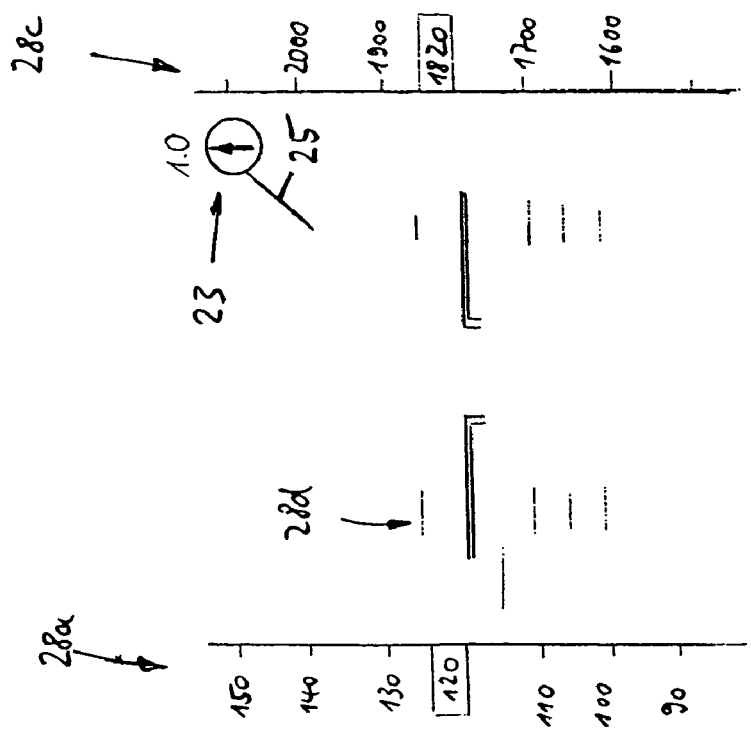
FIG. 5 shows the flight control display according to the invention in a situation where the runway is located outside the pilot's range of visibility.

FIGS. 5 and 6 show a display appearing to the pilot in the HUD. In FIG. 5 the runway is outside the visible range of the pilot and in FIG. 6 the runway is in his visible range.

The flight control display according to the invention can also optionally include a function that directs the reference line 25 at the destination 13*a* as soon as the destination should appear through the HUD in order to facilitate the pilot's location of it (FIG. 6). This type of function can be recognized by the pilot from the fact that the reference line 25 is not at an angle to the skyline, but points in the vertical direction in the case of a horizontal flight position.

In general, the flight control display according to the invention can be depicted on a screen, projected into the visible range of the pilot via a HUD, or projected onto a visor. All other combinations available with display techniques based on the state of the art are also possible.

Figure 7:
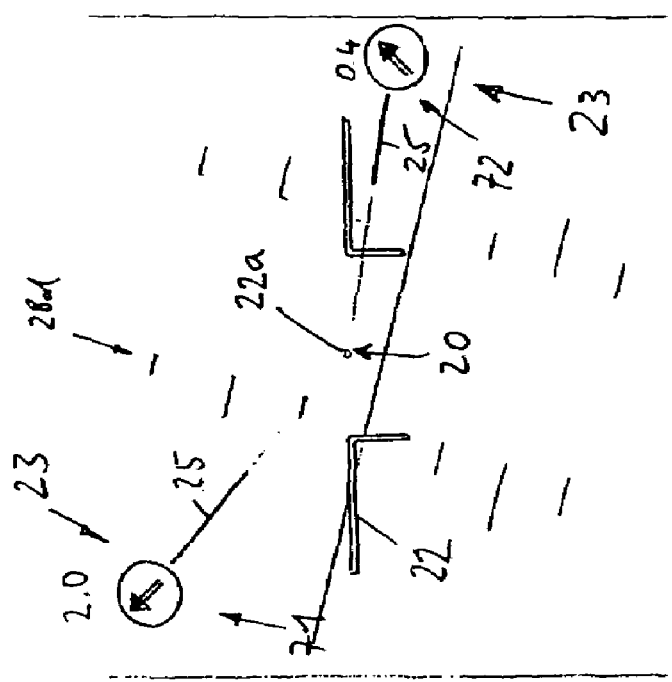
FIG. 7 shows the flight control display according to the invention, where the center of the display is the aircraft symbol and the reference line of the destination position symbol is directed at the aircraft symbol, wherein two different situations are shown.

In the embodiment shown in FIG. 7, the reference line 25 of the destination position symbol 23 is directed at the center of the aircraft symbol 22, which coincides with the center 20 of display in any situation. In this view, the skyline 21 is rotated beneath the center of the aircraft symbol 22, which shows that the aircraft's direction (compared to the horizontal plane) is aligned upward at an attitude. In the display in FIG. 7, two examples of positions of the destination position symbol 23 have been entered. Position 71 shows that the destination is to the left in front of the aircraft from the pilot's view. The direction of the aircraft here deviates from the desired direction at the destination (e.g., the runway direction) by 45°. Since in this display the aircraft symbol 22 is defined as a reference line, the abeam position is determined by the "wings" of the aircraft symbol. Accordingly, the destination position symbol 23 at the location 72 indicates that the destination is located to the right, slightly behind the aircraft from the pilot's view.

Figure 8:
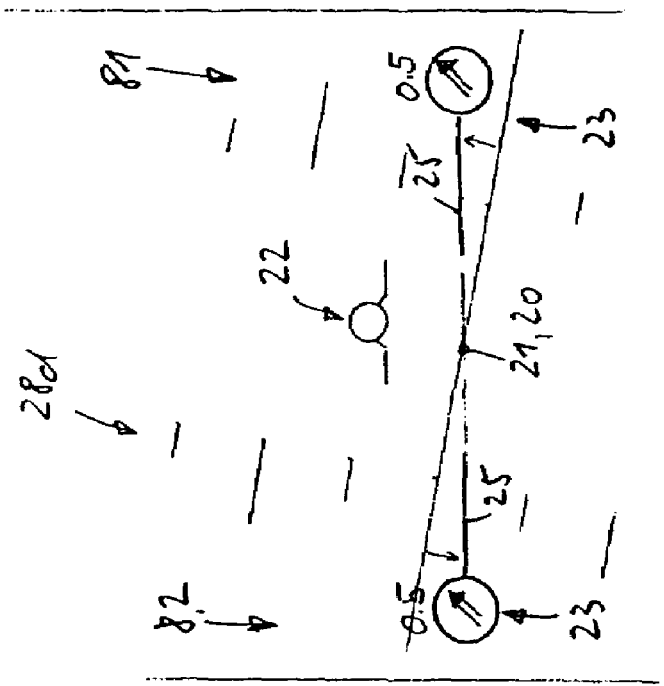
FIG. 8 shows another embodiment of the flight control display according to the invention, in which the center of the display is the center of the skyline and the reference line of the destination position symbol is also directed at the center of the skyline, wherein this display on the one hand shows a situation where the destination is located behind the aircraft and on the other hand shows a situation where the destination is located in front of the aircraft.

In FIGS. 3, 5, 6, 7 the aircraft symbol consists of two parts, which indicate a wing and the vertical axis of the aircraft, respectively, and which are located at a distance toward the vertical center axis of the view and symmetrical to each other. In FIGS. 2 and 8, the aircraft symbol 22 is depicted as a circle with two horizontal lines extending therefrom in opposite directions, symbolizing the wings. Of course, other symbols can also be used in the flight control display according to the invention as long as they allow a direct conclusion about the position of the lateral axis of the aircraft and the position of the longitudinal axis.

FIGS. 7 and 8 both show situations where the aircraft is flying in a curve. The flight control display according to the invention displays this by rotating the skyline 21 around its center while the aircraft symbol 22 remains in its constant rotated position.

In the flight control display in FIG. 8, the reference line 25 refers to the center 21*a* of the skyline. Therefore the position of the position symbol 26 at the location 81 (i.e., from the pilot's view above the skyline 21) indicates that the destination is located to the right slightly in front of the aircraft from the pilot's view. The position symbol 26 at the location 82, i.e. beneath the skyline 21, indicates that the destination is located to the left slightly behind the aircraft from the pilot's view.

Since in the embodiment in FIG. 7 the reference line 25 is directed at the center 22*a* of the aircraft symbol 22, it is important whether the reference line 25 with the position symbol 26 is located above or beneath the cross-line 22*b* of the aircraft symbol 22 from the pilot's view in order to be able to determine whether the destination is located in front of or behind the aircraft from the pilot's view.

For the flight control display according to the invention it is essential that the reference line 25 is directed a reference point that is either the center 21a of the skyline or the center 22a of the aircraft symbol 22. The center 20 of display can therefore be located in the center 21a or in the ter 22a or at a location above or beneath one of these points. position symbol 26 is optional. If it is not incorporated, end of the reference line 25, which is located away from the rerence point, symbolizes the destination.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A flight control display for control display for orientation of a pilot of an aircraft during an approach toward a destination, said display comprising:
    a center of the display as a fixed point which depicts the position of the aircraft in a horizontal plane, viewed from above;
    an aircraft symbol with a center that indicates a longitudinal axis of the aircraft, and a lateral line that indicates a current attitude of the aircraft;
    a destination position symbol, which includes a reference line, and a position symbol that has a predetermined shape and corresponds to a desired destination in said horizontal plane; and
    a skyline with a center; wherein,
    one of the following is true,
    i) the aircraft symbol is displayed at the center of the display; and
    ii) the skyline is displayed with its center at the center of the display;
    when the aircraft rotates about the longitudinal axis by a first angle, the skyline and the aircraft symbol rotate relative to each other, by the same first angle;
    the destination position symbol is displayed at a distance from the center and its reference line points to the center of the display as a reference point, such that the reference line indicates a direction from the aircraft to the destination, in said horizontal plane; and
    the destination position symbol is rotated around the reference point depending on the aircraft's direction relative to the desired destination direction.

2. The flight control display in accordance with claim 1, wherein the reference point is the center of the skyline.

3. The flight control display in accordance with claim 1, wherein the reference point is the center of the aircraft symbol.

4. The flight control display in accordance with claim 1, wherein:
    the desired destination symbol includes a position symbol which symbolizes the position of the destination; and
    the position symbol is located at an end of the reference line opposite an end nearest the reference point.

5. The flight control display in accordance with claim 4, wherein the position symbol includes a desired destination direction display indicating a desired direction at the destination relative to a current direction of the aircraft.

6. The flight control display in accordance with claim 5, wherein the desired destination direction display is an arrow that points in the desired direction.

7. The flight control display in accordance with claim 1, wherein the destination position symbol has a numerical display, which indicates a distance of the aircraft from the destination.

8. The flight control display in accordance with claim 1, wherein the display is a HUD.

9. The flight control display in accordance with claim 1, wherein the flight control display is a screen.

10. The flight control display in accordance with claim 1, wherein the flight control display is an HMD.

* * * * *